United States Patent [19]

Maheshwari et al.

[11] Patent Number: 4,852,039
[45] Date of Patent: Jul. 25, 1989

[54] APPARATUS AND METHOD FOR ACCELERATING FLOATING POINT ADDITION AND SUBTRACTION OPERATIONS BY ACCELERATING THE EFFECTIVE SUBTRACTION PROCEDURE

[75] Inventors: Vijay Maheshwari, Northboro; Sridhar Samudrala, North Grafton; Nachum M. Gavrielov, Ashland, all of Mass.

[73] Assignee: Digital Equipment Corporation, Maynard, Mass.

[21] Appl. No.: 64,836

[22] Filed: Jun. 19, 1987

[51] Int. Cl.$^4$ .............................................. G06F 7/38
[52] U.S. Cl. ................................................... 364/748
[58] Field of Search ................................. 364/748, 715

[56] References Cited

U.S. PATENT DOCUMENTS 4,562,553 12/1985 Mattedi et al. ...................... 364/745
4,639,887 1/1987 Farmwald ............................ 364/748
4,644,490 2/1987 Kobayashi et al. ................. 364/748

OTHER PUBLICATIONS

Bidermann et al., "The MicroVAX 78132 Floating Point Chip", Digital Technical Journal, No. 2, Mar. 1986, pp. 24-36.

Primary Examiner—Gary V. Harkcom
Assistant Examiner—Tan V. Mai
Attorney, Agent, or Firm—William W. Holloway; William C. Cray

[57] ABSTRACT

The arithmetic operations performed for floating point format numbers involve procedures having a multiplicity of major steps. The effective subtraction operation can be accelerated by using two methods of execution depending on whether the absolute value of the difference between the arguments of the exponents, ABS{DELTA(E)} is ≦1 or >1. The procedure for ABS{DELTA(E)}≦1 requires more major process steps than the situation where ABS{DELTA(E)}≦1. To accelerate only the procedure having more major process steps, the two least significant bits of both exponent arguments are examined and based on the examination, the lengthier procedure can be initiated in parallel with the process step determining the value of ABS{DELTA(E)}. When the lengthier procedure is determined to be inappropriate based on the determined value, the results of the lengthier process can be discarded. Otherwise, the lengthier process, already in progress, is continued.

20 Claims, 7 Drawing Sheets

| | Ea1 | Ea0 | Eb1 | Eb0 | POTENTIAL EXPONENT DIFFERENCE | OPERATION DONE |
|---|---|---|---|---|---|---|
| 1. | 0 | 0 | 0 | 0 | Ea = Eb    i.e. \|DELTA(E)\| = 0 | Fa−Fb |
| 2. | 0 | 0 | 0 | 1 | Ea + 1 = Eb    i.e. DELTA(E) = −1 | Fb−Fa/2 |
| 3. | 0 | 0 | 1 | 0 | \|DELTA(E)\| > 1 | |
| 4. | 0 | 0 | 1 | 1 | Ea = Eb + 1    i.e. DELTA(E) = 1 | Fa−Fb/2 |
| 5. | 0 | 1 | 0 | 0 | Ea = Eb + 1    i.e. DELTA(E) = 1 | Fa−Fb/2 |
| 6. | 0 | 1 | 0 | 1 | Ea = Eb    i.e. \|DELTA(E)\| = 0 | Fa−Fb |
| 7. | 0 | 1 | 1 | 0 | Ea + 1 = Eb    i.e. DELTA(E) = −1 | Fb−Fa/2 |
| 8. | 0 | 1 | 1 | 1 | \|DELTA(E)\| > 1 | |
| 9. | 1 | 0 | 0 | 0 | \|DELTA(E)\| > 1 | |
| 10. | 1 | 0 | 0 | 1 | Ea = Eb + 1    i.e. DELTA(E) = 1 | Fa−Fb |
| 11. | 1 | 0 | 1 | 0 | Ea = Eb    i.e. \|DELTA(E)\| = 0 | Fa−Fb |
| 12. | 1 | 0 | 1 | 1 | Ea + 1 = Eb    i.e. DELTA(E) = −1 | Fb−Fa/2 |
| 13. | 1 | 1 | 0 | 0 | Ea + 1 = Eb    i.e. DELTA(E) = −1 | Fb−Fa/2 |
| 14. | 1 | 1 | 0 | 1 | \|DELTA(E)\| > 1 | |
| 15. | 1 | 1 | 1 | 0 | Ea = Eb + 1    i.e. DELTA(E) = 1 | Fa−Fb/2 |
| 16. | 1 | 1 | 1 | 1 | Ea = Eb    i.e. \|DELTA(E)\| = 0 | Fa−Fb |

WHERE:
- Ea1 IS BIT NUMBER 1 OF THE EXPONENT OF THE FIRST OPERAND
- Ea0 IS BIT NUMBER 0 OF THE EXPONENT OF THE FIRST OPERAND
- Eb1 IS BIT NUMBER 1 OF THE EXPONENT OF THE SECOND OPERAND
- Eb0 IS BIT NUMBER 0 OF THE EXPONENT OF THE SECOND OPERAND
- DELTA(E) IS Ea − Eb
- Fa IS THE FRACTION FIELD OF THE FIRST OPERAND.
- Fb IS THE FRACTION FIELD OF THE SECOND OPERAND.

FIG. 6.

APPARATUS AND METHOD FOR ACCELERATING FLOATING POINT ADDITION AND SUBTRACTION OPERATIONS BY ACCELERATING THE EFFECTIVE SUBTRACTION PROCEDURE

RELATED U.S. PATENT APPLICATIONS

The following U.S. patent applications are related to the present invention.

APPARATUS AND METHOD FOR EXECUTION OF FLOATING POINT OPERATIONS, invented by Sridhar Samudrala, Victor Peng and Nachum Moshe Gavrielov, having Ser. No. 06/879,337, filed June 27, 1986 and assigned to the assignee of the present Application.

APPARATUS AND METHOD FOR ACCELERATION OF EFFECTIVE SUBTRACTION PROCEDURES BY THE APPROXIMATION OF THE ABSOLUTE VALUE OF THE EXPONENT ARGUMENT DIFFERENCE, invented by Paul Edward Gronowski, Victor Peng and Nachum Moshe Gavrielov, having Ser. No. 07/064,835, filed on June 19, 1987 and assigned to the assignee of the present Application.

BACKGROUND OF THE INVENTION

1. Field of the Invention

This invention relates generally to data processing systems and, more particularly, to the apparatus for executing the floating point operations of a data processing system.

2. Description of the Related Art

Data processing systems are typically provided with the capability of manipulating numerical quantities stored in the floating point format. In the floating point format, a numerical quantity is represented by a fraction value and by an argument value. The argument value represents the power to which the exponent base is raised, while the fraction value represents the number multiplying the exponential portion of the number. The principal advantage of the floating point format is the increased range of numbers that can be manipulated in the data processing systems without instituting extraordinary procedures or conventions. A floating point processor capable of advantageously using the invention disclosed herein is described in "The MicroVAX 78132 Floating Point Chip" by William R. Bidermann, Amnon Fisher, Burton M. Leary, Robert J. Simcoe and William R. Wheeler, Digital Technical Journal, No. 2, March 1986, pages 24–36.

The floating point format has the disadvantage that the execution of addition and subtraction operations in this data format is more complex and requires a greater time period than the same operation in the standard integer data format. This complexity is a result of having to align the fractions prior to addition or subtraction so that exponents are identical and then, potentially having to normalize the resulting quantity, i.e., shifting the fraction portion of the resulting quantity until a logic "1" is stored in the most significant position and adjusting the argument of the exponent is adjusted accordingly.

Referring now to FIG. 1, the addition and subtraction operations are defined in terms of effective addition and effective subtraction operations which more correctly identify related operation sequences. The addition and subtraction operations 101 are grouped into an effective addition operation 102 and an effective subtraction operation 103. The effective addition operation 102 includes the operations of adding operands that have the same sign and subtracting operands that have different signs. The effective subtraction operation 103 includes the addition of operands with differing signs, and the subtraction of operands with the same sign.

Referring next to FIG. 2, the steps for performing the effective subtract operation, according to the related art, are shown. In step 201, the difference in the exponent arguments is determined. Based on the difference in the exponent arguments, the logic signals representing the smaller operand are shifted until the arguments of the exponents representing the two operands are the same i.e., the operand fractions are aligned. The aligned quantities are then subtracted. If the resulting quantity is negative, then the 2's complement must be calculated, i.e., the subtrahend was larger than the minuend. The most significant non-zero bit position (i.e., the leading logic "1" signal) is determined and based on this bit position, the resulting quantity operand, is normalized i.e., +, the leading logic "1" signal of the fraction is shifted to the most significant bit position and the argument of the exponent is adjusted accordingly. As will be clar to those familiar with the implementation of floating point operations, the seven steps of the effective subtraction operation of FIG. 2 can require a relatively long time for their execution.

A need has therefore been felt for a procedure and associated apparatus for accelerating the effective subtraction operation.

FEATURES OF THE INVENTION

It is an object of the present invention to provide an improved data processing system.

It is a feature of the present invention to provide improved apparatus for the execution of floating point operations in a data processing system.

It is another feature of the present invention to provide a technique for acceleration of the effective subtraction operation in a floating point unit of a data processing system.

It is a more particular feature of the present invention to provide a selection circuit for controlling operation of the effective subtraction operation based on the two least significant bit signals of the operand exponent arguments.

SUMMARY OF THE INVENTION

The aforementioned and other features are accomplished, according to the present invention, by providing in a floating point execution unit a relatively fast procedure for performing an effective subtraction operation when the absolute value of the difference between operand exponent arguments is greater than 1. When this difference is less than or equal to 1, than a longer procedure is employed. To expedite the effective subtraction operation, the longer procedure is initiated prior to determination of the operand exponent argument difference. Apparatus for comparing the two least significant bit positions of the exponent arguments of two operands permits the correct operands to be used in the longer procedure. This longer procedure is continued until a complete difference between the two exponent arguments is determined. Then the procedure currently being executed can be continued, when, based on the complete operand exponent argument difference, the executing procedure is the correct procedure. Otherwise the executing procedure is replaced by the correct procedure.

These and other features of the present invention will be understood upon reading of the following description along with the drawings.

BRIEF DESCRIPTION OF THE DRAWINGS

FIG. 6 is a table understanding all combinations of the two least significant bits for the two exponent arguments and the operations on the associated operand fractions resulting from the combinations.

DESCRIPTION OF THE PREFERRED EMBODIMENT

1. Detailed Description of the Figures

Figure 1:
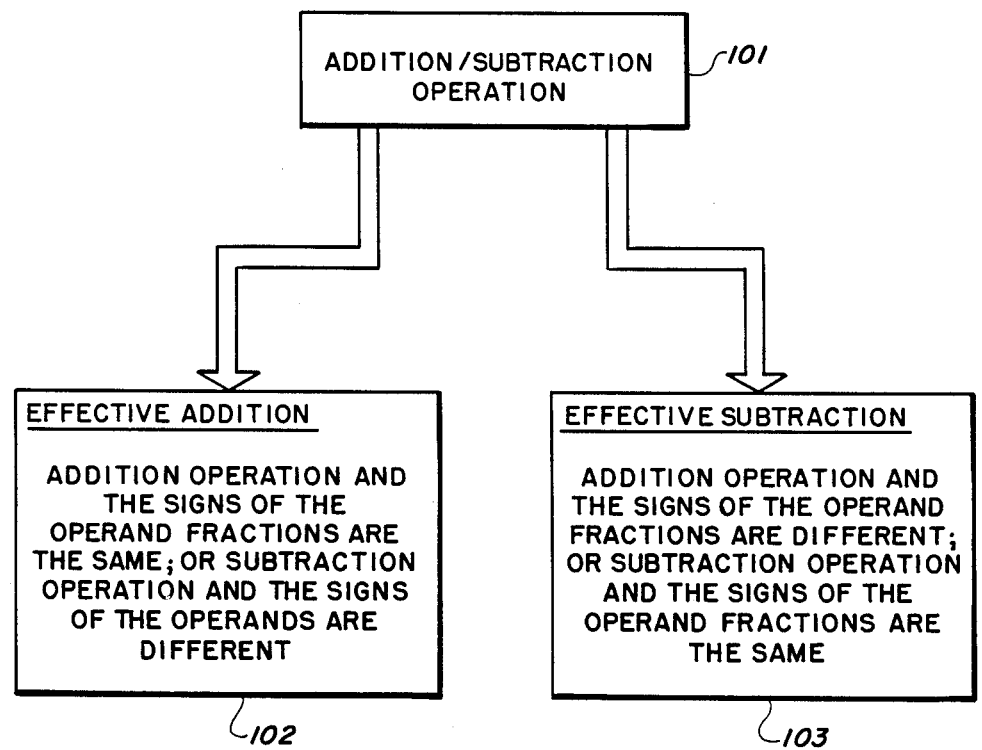
FIG. 1 illustrates the relationship between the addition and subtraction operations and the effective addition and the effective subtraction operations.
Figure 2:
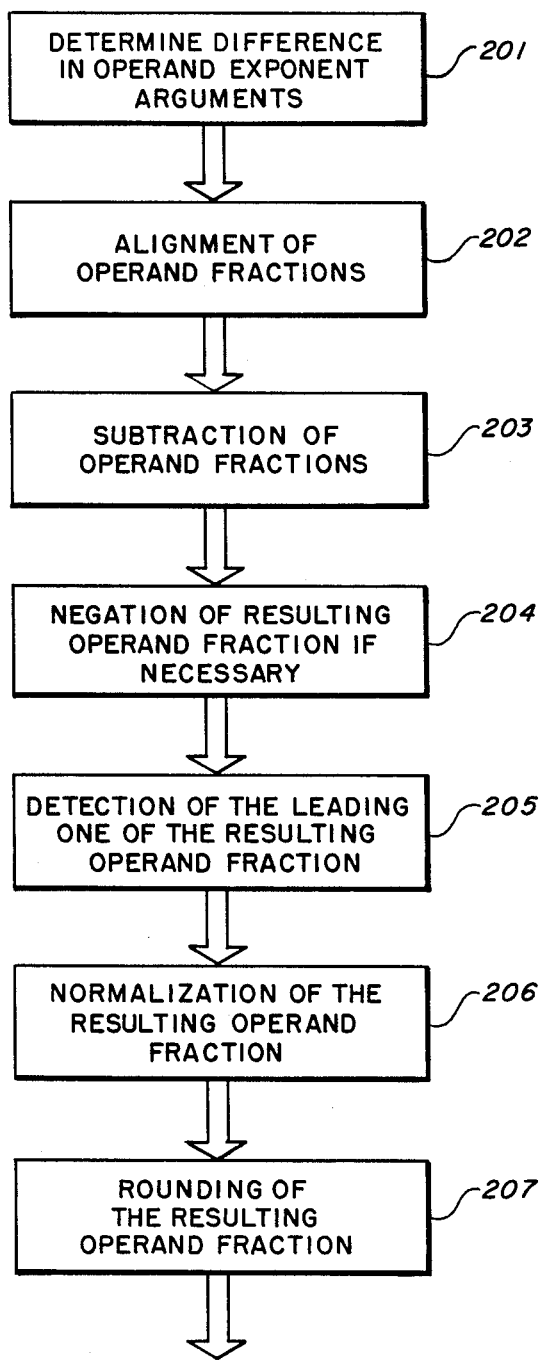
FIG. 2 illustrates the steps for performing the effective subtraction operation according to the related art.

FIG. 1 and FIG. 2 have been described with reference to the related art.

Figure 3:
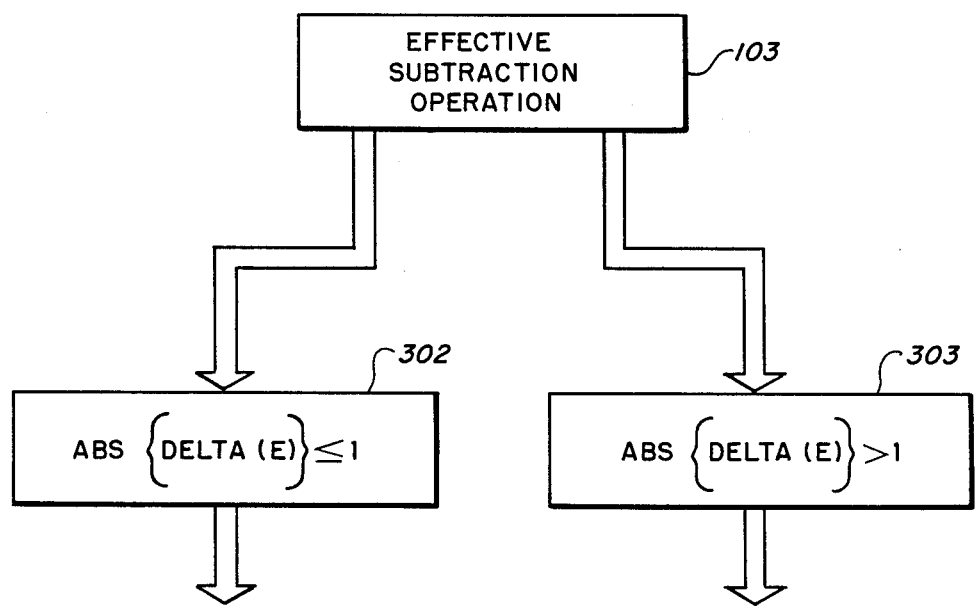
FIG. 3 illustrates the two procedures into which the effective subtraction operations are divided in order to accelerate their execution.

Referring to FIG. 3, the effective subtraction operation can be accelerated by first considering the situation where the absolute value of the difference in the arguments of the exponents of the two operands, or the absolute value of DELTA (E), is $\leq 1$ (i.e., is 0 or 1) or is $> 1$ (i.e., all other values), that is, ABS{DELTA(E)}$\leq 1$ or ABS{DELTA(E)}$> 1$.

Figure 4:
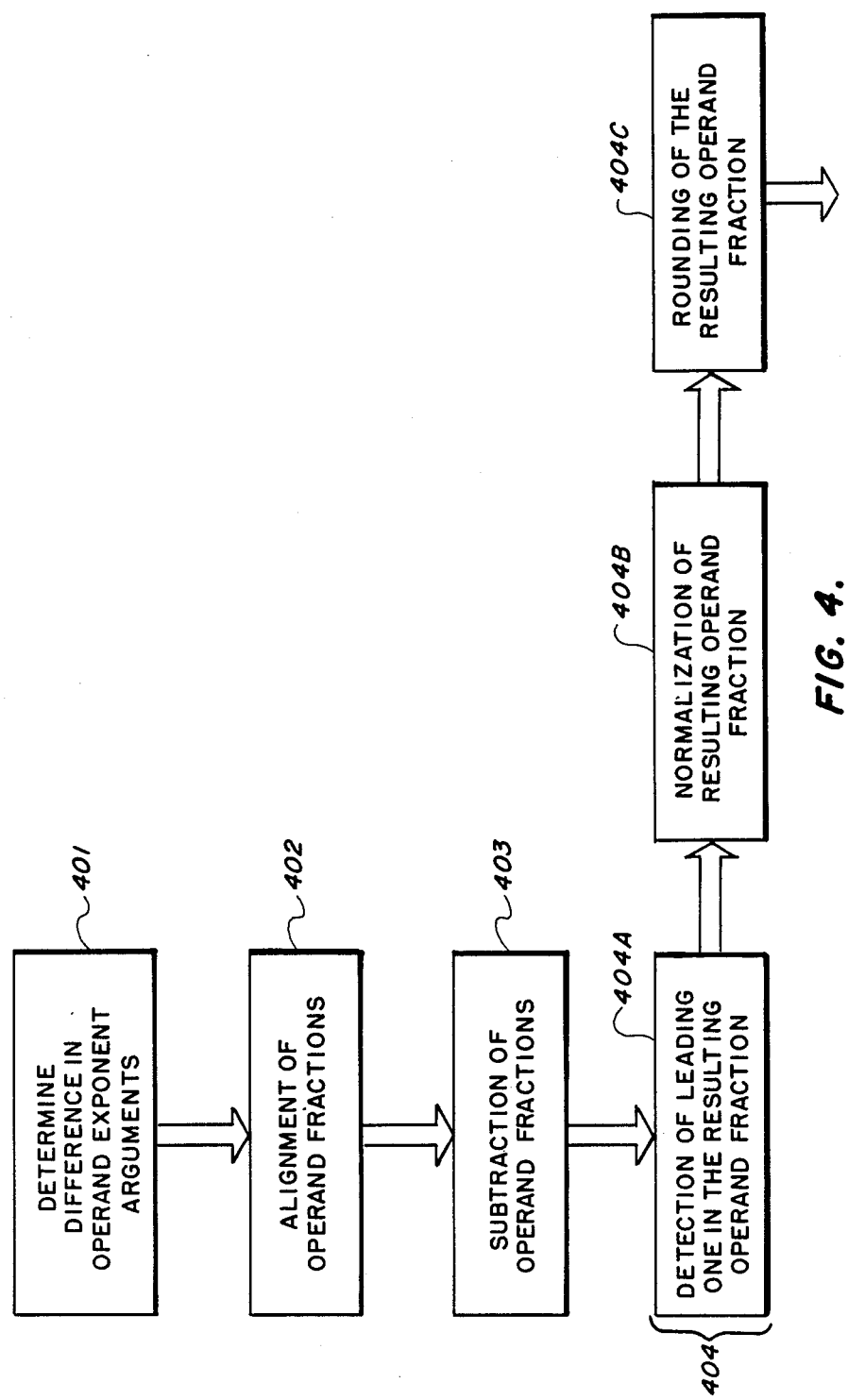
FIG. 4 illustrates the steps in the effective subtraction operation when the absolute value of the difference of the exponent arguments is greater than one.

Referring next to FIG. 4, the situation when ABS{DELTA(E)}$> 1$ is examined in more detail. Comparing FIG. 4 with FIG. 2, the determination of the difference in the arguments of the exponents is performed in each case, in step 201 and in step 401. In step 402 as compared with step 202, the alignment operation requires a relatively large shifting operation. However, because the larger operand is identified, the subtraction operation, performed in steps 203 and 403 can be performed in such a manner as to insure that a positive resultant quantity is obtained by the operation, obviating, in the process of, illustrated in FIG. 4, the necessity of a step equivalent to the step 204 for the negation of the resulting operand. Because of the amount of the difference between operands, the normalization will require a shift or at most one bit position for the resulting operand. A one bit position shift does not require a separate step and the detection of the leading logic "1" signal in step 404A, the normalization in step 404B and the rounding operation in step 404C can be considered a single time consuming step 404 rather than three time consuming steps (i.e., step 205, 206 and 207) in FIG. 2.

Figure 5:
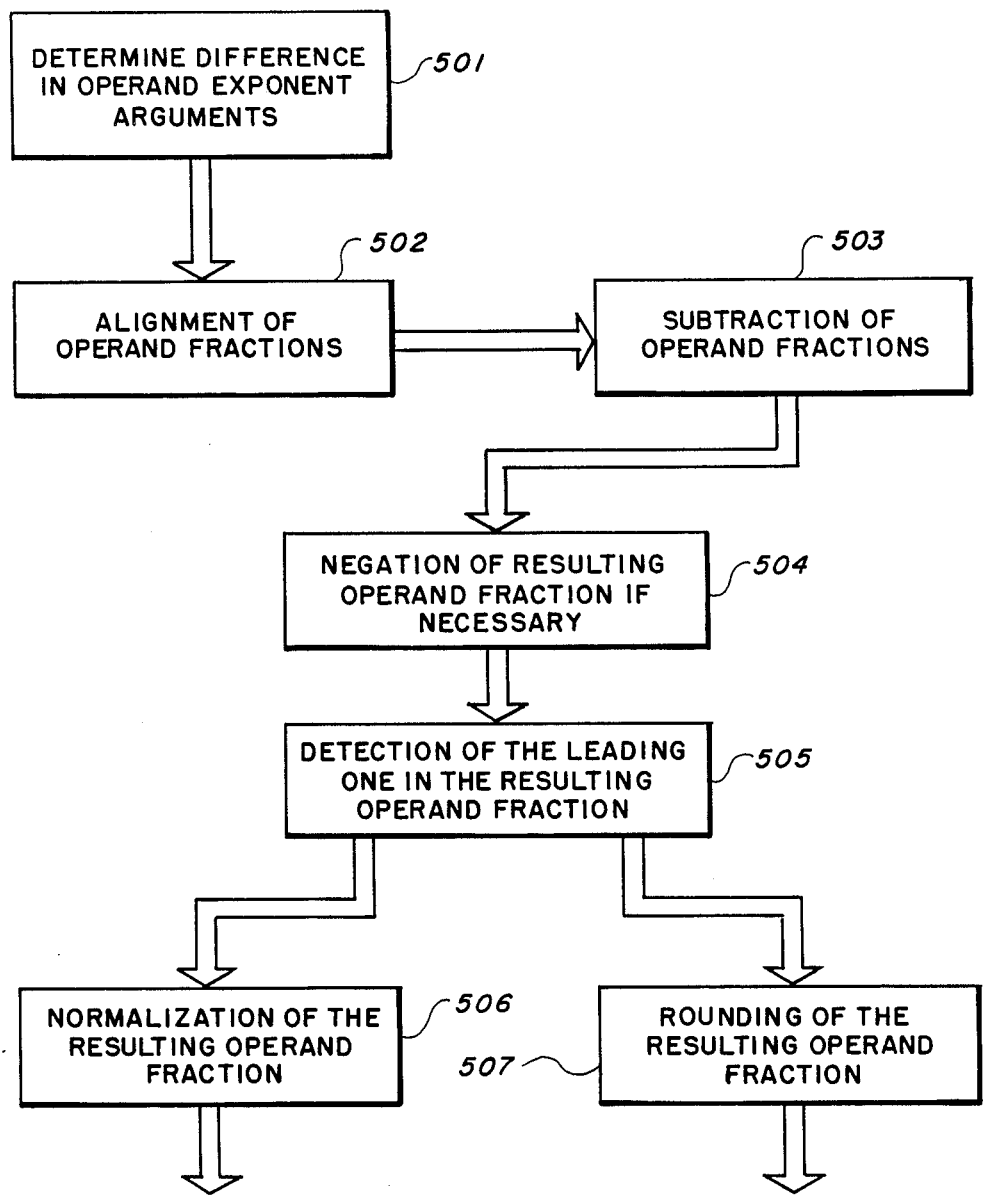
FIG. 5 illustrates the steps in the effective subtraction operation when the absolute value of the difference of the exponent arguments is less than or equal to one.

Referring next to FIG. 5 the technique for reducing the time to execute (i.e., by accelerating) the effective subtraction operation when ABS{DELTA(E)}$\leq 1$ is shown. In step 501, the difference in the exponent arguments is determined. Because of the small difference in the arguments, the alignment of the fractions in step 502 can be performed without requiring a separate step (or "on the fly") before performing the subtraction step 503. The negation step 504 can be required, but either the normalization step 506 or the rounding step 507 is required, but not both steps. The procedure reduces the seven major steps to five major steps by the floating point apparatus.

Comparing the procedures in FIG. 4 and FIG. 5, the effective subtraction operation when ABS{DELTA(E)}$\leq 1$ appears to have five major steps, the procedure for ABS{DELTA(E)}$> 1$ has only four major steps. In order to reduce the time to perform the five major steps when ABS{DELTA(E)}$\leq 1$, the following procedure can be employed. When the assumption is made that ABS{DELTA(E)}$\leq 1$, then this procedure can be initiated in parallel to the step of determining the difference in the exponent arguments. Thus, the lengthier procedure will have been begun before criterion is established. When the criterion is determined, then the longer procedure already in progress can be continued. Otherwise the shorter procedure can be instituted. However, referring to FIG. 5, the alignment step 502 can have three implementations depending on the result of the difference in arguments of the exponents. In order to utilize the accelerated effective subtration, an expedited procedure must be developed to determine which of the three alignment procedures should be utilized.

The present invention examines only the two least significant bits (lsbs) of the argument of the exponent to provide this determination. Referring next to FIG. 6, all the possible combinations for the two least significant bits of each argument is explicitly shown. The ABS{DELTA(E)}$=0$ for exponents illustrated in Examples 1, 6, 11, and 16. In these cases, the operation performed in step 503 of FIG. 5 is $FRACTION_A - FRACTION_B$ of the operands. In Examples 2, 7, 12, and 13, DELTA(E)$= -1$, indicating that the $FRACTION_A$ must be shifted one position to the right so that the operation performed in step 503 of FIG. 5 is $FRACTION_B - FRACTION_A/2$. In the Examples 4, 5, 10, and 15 of FIG. 6, DELTA(E)$=1$. The operation performed as a result of the identification of this value is a shifting of $FRACTION_B$ for the alignment step of 502 and the step 503 will be $FRACTION_A - FRACTION_B/2$. Finally, for the bit positions in the argument of the exponents having the values illustrated by Examples 3, 8, 9, and 14 wherein ABS{DELTA(E)}$> 1$, the procedure illustrated in FIG. 4 is the correct procedure and involves only four major steps.

Figure 7:
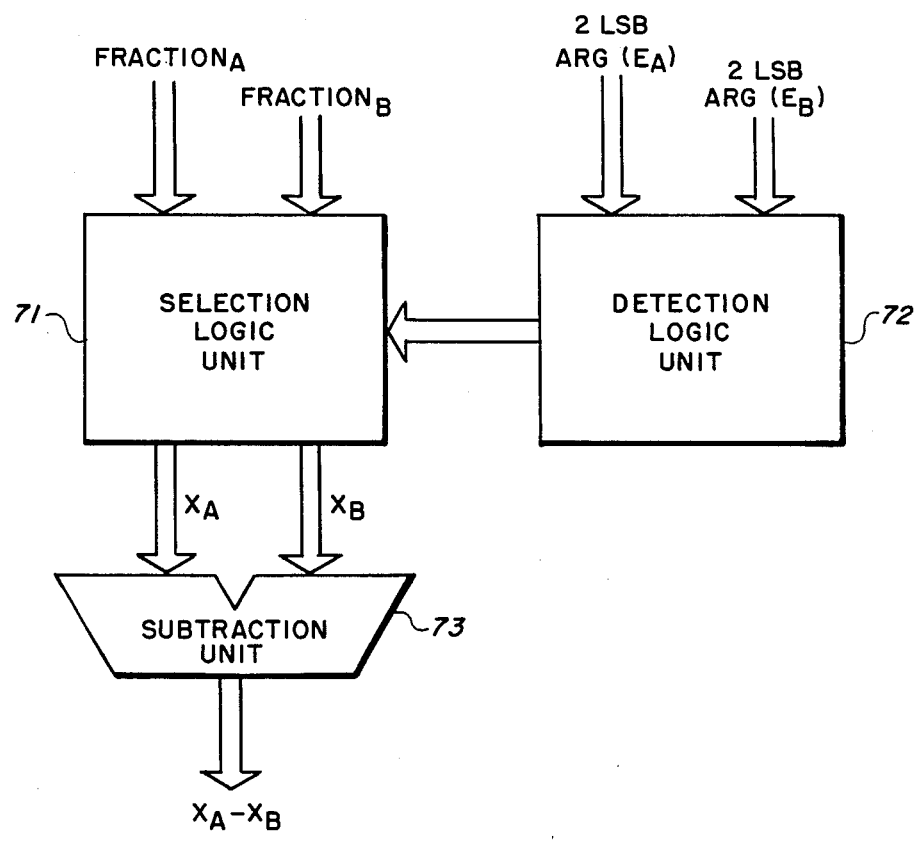
FIG. 7 illustrates the apparatus that can be used to implement the present invention.

Referring next to FIG. 7, the apparatus required to accelerate the effective subtraction operation when ABS{DELTA(E)}$\leq 1$ is illustrated. The two least significant bits of the exponent argument $E_A$ and the two least significant bits of the exponent argument $E_B$ are applied to detection logic 72. The detection logic 72 selects the appropriate operation to be performed on the two operands as determined by FIG. 6. The $FRACTION_A$ and $FRACTION_B$ signal groups, applied to the selection logic 71 are shifted where appropriate and applied to the input terminals of the subtraction unit 73 as determined by the output signals of the detection logic 72. (The $X_A = FRACTION_A$ or $= FRACTION_A/2$ and $X_B = FRACTION_B$ or $= FRACTION_B/2$.)

2. Operation of the Preferred Embodiment

The present invention accelerates the effective subtraction procedure by determining which of the two procedures is appropriate. The invention then adds additional apparatus to permit the longer of two possible procedures to begin execution in parallel with the determination of which of the two procedures is correct. When the longer of the two procedures is correct, then the execution of the longer procedure, already begun, continues. The additional apparatus permits a rapid selection of the three possible subroutines implementing the longer procedure. The additional apparatus controls the operand fractions used in the longer (FIG. 5) procedure based on a comparison of the 2 least significant bits of the two operand exponent arguments. When the shorter of the two procedures is correct, the execution of the longer procedure is discontinued and execution of the shorter procedure begun. The additional equipment to implement the invention is minimal while an improvement in the worst case execution time can be achieved. The invention has application to a variety of floating point execution procedures such as the IEEE P754 standard. In the preferred embodiment, the floating point execution unit operates under microprocessor control.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A floating point execution unit comprising:
   addition means for performing an effective addition operation involving two operands in a floating point format; and
   subtraction means for performing an effective subtraction operation involving two operands in a floating point format, said subtraction means including:
      difference means for determining a difference between exponential arguments of said floating point operands;
      alignment means response to said difference means for aligning for fractions of said operands;
      subtraction unit for executing a first subtraction procedure in combination with said alignment unit when an absolute value of a difference between exponent arguments of two least significant bits of said two operands is less than or equal to absolute one; and
      negation means for negating a resultant operand from said subtraction unit when said resultant operand is less than zero for said first subtraction procedure;
      wherein said subtraction unit executes a second subtraction procedure in combination with said alignment means when an absolute value of a difference between exponential arguments of said two operands is greater than one.

2. The floating point execution unit of claim 1 wherein said first subtraction procedure is longer than said second subtraction procedure, said subtraction unit and alignment means initiating said first subtraction procedure after comparison of said least significant bits of said exponential argument by said difference means provides one of a plurality of preselected values and prior to a determination of said difference between said exponent arguments.

3. The floating point execution unit of claim 2 wherein results of said first subtraction procedure are replaced by said second subtraction procedure when an absolute value of said exponent argument difference is greater than one.

4. The floating point execution unit of claim 3 wherein said alignment means includes a shifter for shifting a selected operand fraction a plurality of positions when said absolute value of a difference between exponent arguments is greater than one.

5. The floating point execution unit of claim 1 wherein said alignment means includes selectable circuit paths for shifting said operand fractions during initiation of execution of said first procedure.

6. The floating point execution unit of claim 5 wherein said subtraction means further includes second alignment means for aligning a resultant operand fraction when said absolute value of said difference between two exponential arguments is less than or equal to one.

7. The floating point execution unit of claim 5 wherein said subtraction means includes rounding means for rounding a resultant operand fraction from said subtraction unit when said absolute value of a difference between exponent arguments is less than or equal to one.

8. A method of executing a floating point operand effective subtraction operation comprising the steps of:
   determining a difference between exponent arguments of two operands;
   initiating a first procedure when a difference between two least significant bits of said operand exponent arguments is less than or equal to absolute one and
   replacing said first procedure with a second procedure when said difference between exponent arguments has an absolute value greater than one;
   wherein said first and second procedure include a subtracting step performed in a single subtraction unit wherein a first operand fraction is subtracted from a second operand fraction.

9. The method of executing a floating point operand effective subtraction operation of claim 8
   wherein said first procedure includes a negation step when an operand fraction resulting from said subtracting step is negative.

10. The method of executing a floating point operand effective subtract operation of claim 8 wherein said initiating step includes the step of identifying a minuend operand and a subtrahend operand by said difference between two least significant bits of associated operand arguments.

11. The method of executing a floating point operand effective subtract operation of claim 10 wherein said initiating step includes aligning said subtrahend with said minuend by shifting said associated operand fraction at most one bit position using controllable circuit paths.

12. The method of executing a floating point operand effective subtract operation of claim 11 wherein
   said replacing step includes the steps of:
   identifying a minuend operand and a sutrahend operand by said difference in exponent arguments; and
   aligning a subtrahend operand fraction with a minuend operand fraction by shifting said subtrahend operand fraction a number of bit positions determined by said difference in exponent arguments.

13. Apparatus for performing a floating point addition or subtraction operation comprising:
  addition means for performing an effective addition operation; and
  subtraction means for performing an effective subtraction operation, said subtraction means including:
    difference means for determining a difference between operand exponent arguments;
    alignment means for aligning operand fractions determined by shifting a subtrahend operand a number of bit positions determined by said difference, said subtrahend operand determined by said difference, wherein a second operand is a minuend operand;
    a subtraction unit for subtracting said subtrahend fraction from said minuend fraction, said alignment means and said subtraction unit initiating a first procedure determined by a difference between two least significant bit positions of said operand exponent arguments has an absolute value less than or equal to one, wherein a second procedure replaces said first procedure in said alignment means and said subtraction unit when said difference between said operand exponent arguments has an absolute value greater than one, said difference between operand exponent arguments determining an operand subtrahend fraction and an operand minuend fraction, said difference between operand exponent arguments determining a number of bit positions said subtrahend fraction is shifted by said alignment means.

14. The apparatus for performing a floating point addition or subtraction operation of claim 13 wherein said subtraction means includes a normalization means for normalizing a resulting operand fraction from said subtraction unit during said first procedure.

15. The apparatus for performing a floating point addition or subtraction operation of claim 14 wherein said subtraction means includes a rounding means for rounding said first procedure resulting fraction, wherein each first procedure resulting fraction is processed by a one of said normalization means and said rounding means.

16. The apparatus for performing a floating point addition or subtraction operation of claim 15 wherein a resulting fraction of said second procedure is normalized by circuit paths controlled by a leading logic one signal.

17. The apparatus for performing a floating point addition or subtraction operation of claim 16 wherein said alignment means includes circuit paths for shifting said first procedure subtrahend fraction.

18. The apparatus for performing a floating point operation of claim 17 wherein said subtraction means includes a shifter unit for aligning said second procedure subtrahend fraction a plurality of positions.

19. The apparatus for performing a floating point operation of claim 3 wherein said first procedure includes five major steps and said second procedure includes four major steps.

20. The apparatus for performing a floating point operation of claim 3 wherein said first and said second procedure are operated under microprocessor control.

* * * * *